Figure 1:
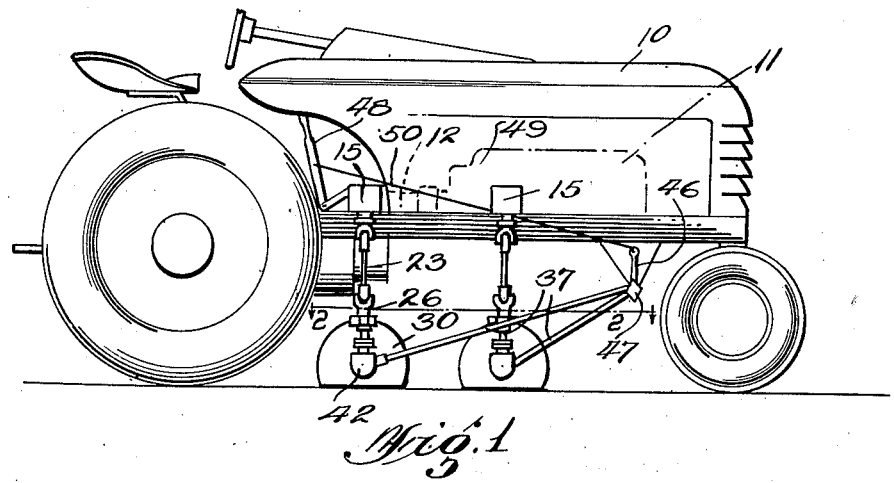

Oct. 31, 1944.  H. T. SMITH  2,361,798
POWER-OPERATED ROTARY HOE
Filed Aug. 3, 1942  3 Sheets-Sheet 1

H. T. Smith, Inventor

H. W. Dahm, Attorney

Oct. 31, 1944.   H. T. SMITH   2,361,798
POWER-OPERATED ROTARY HOE
Filed Aug. 3, 1942   3 Sheets-Sheet 2
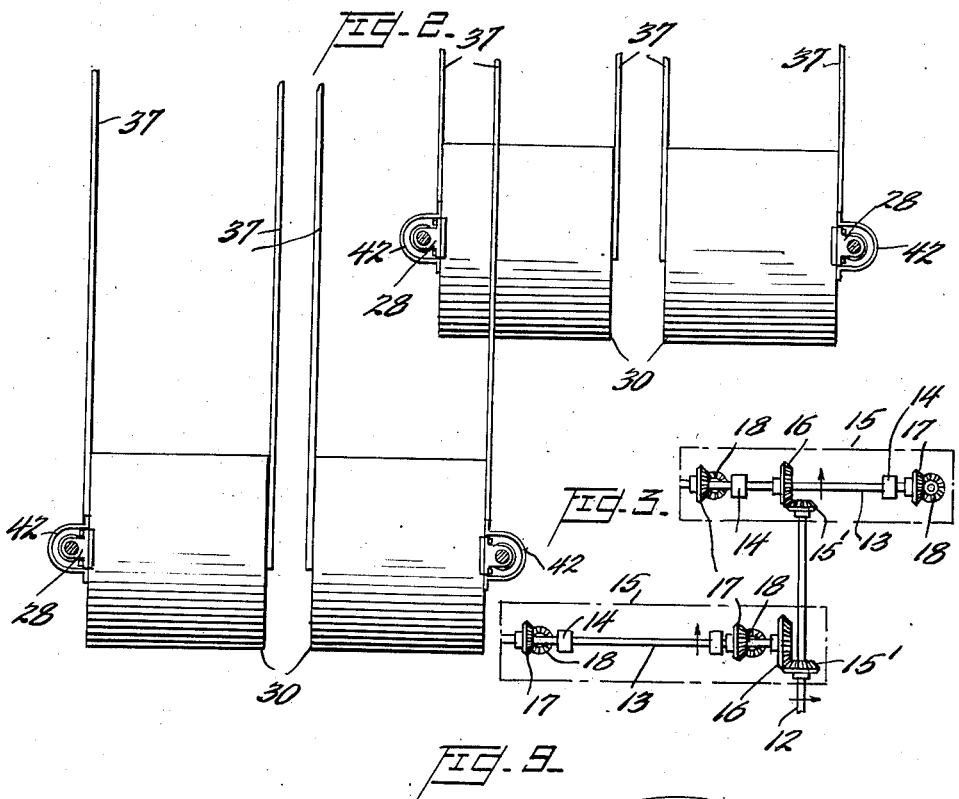
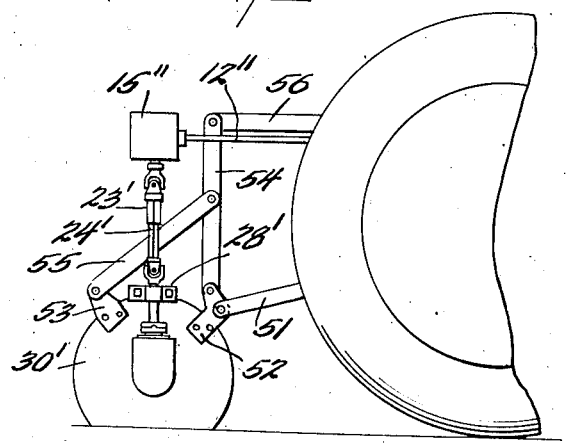
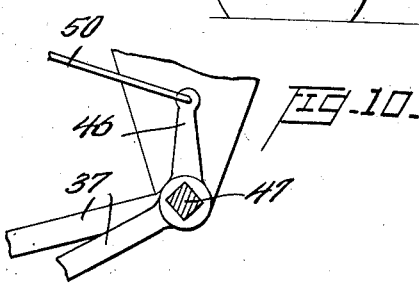
Inventor
H. T. Smith,
By
D. W. Dalu,
Attorney

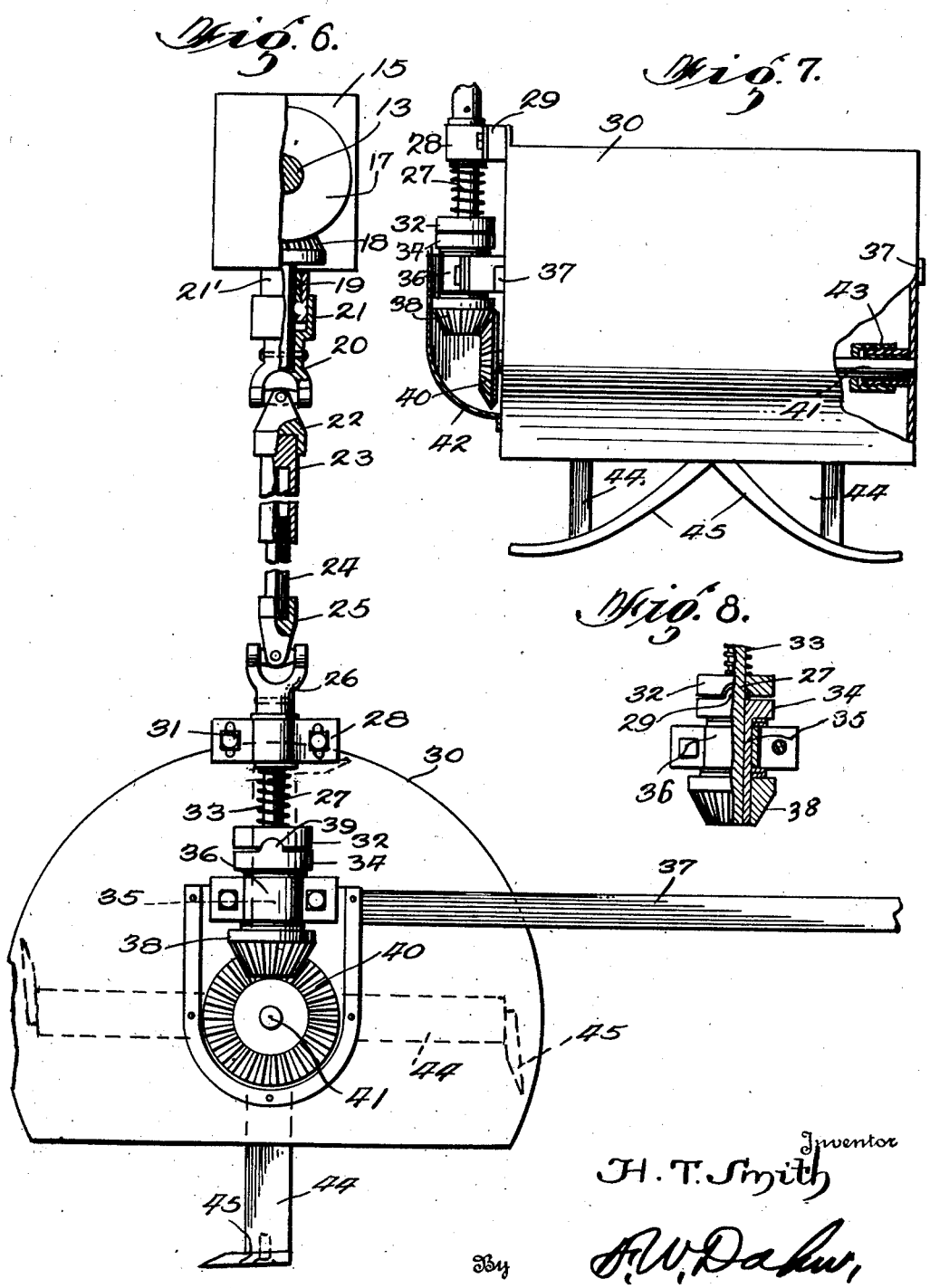

Patented Oct. 31, 1944

2,361,798

UNITED STATES PATENT OFFICE 2,361,798

POWER-OPERATED ROTARY HOE

Harry T. Smith, Hixton, Wis.

Application August 3, 1942, Serial No. 453,443

5 Claims. (Cl. 97—40)

My invention relates to a power-operated rotary hoe intended primarily for use in cultivating farm crops that are planted in rows, such as corn, but obviously it may be used for other purposes. For example, this hoe may be attached to a tractor to cut up corn stalks into short lengths when plowing corn ground.

A rotary hoe has definite advantages over hand hoeing, as being much more speedy and as lightening labor due to its operating by power, while it also leaves the soil in better condition than does hand hoeing. It has also a great advantage over shovel cultivators, particularly when used on hilly or rolling ground, since it leaves the soil smooth and without any shovel trenches, serving effectively to reduce erosion on rolling ground or even to prevent it altogether. It also leaves the soil mulched and reduces evaporation better than any other known means or method of cultivation. It is possible by the use of my device to work close to the plants, even as close as 3/4 inch at each side of a row of plants, thus leaving only a strip of soil 1½ inches width uncultivated for each row of plants.

It is an object of my invention to provide a rotary hoe embodying the advantages above set forth, yet which shall be simple and inexpensive in construction, while being very strong and rigid and easily handled in the field.

A further object is to provide means to permit the drive for the hoes to yield if a hoe strikes a solid object, so as to avoid damage to the mechanism.

Another object is to provide driving means for the hoes such as to permit them to be raised out of working positions without necessarily stopping their rotation.

Other objects and advantages will appear from the following description and from the annexed drawings which are made a part of this application and in which similar reference characters indicate similar parts.

Figure 4:
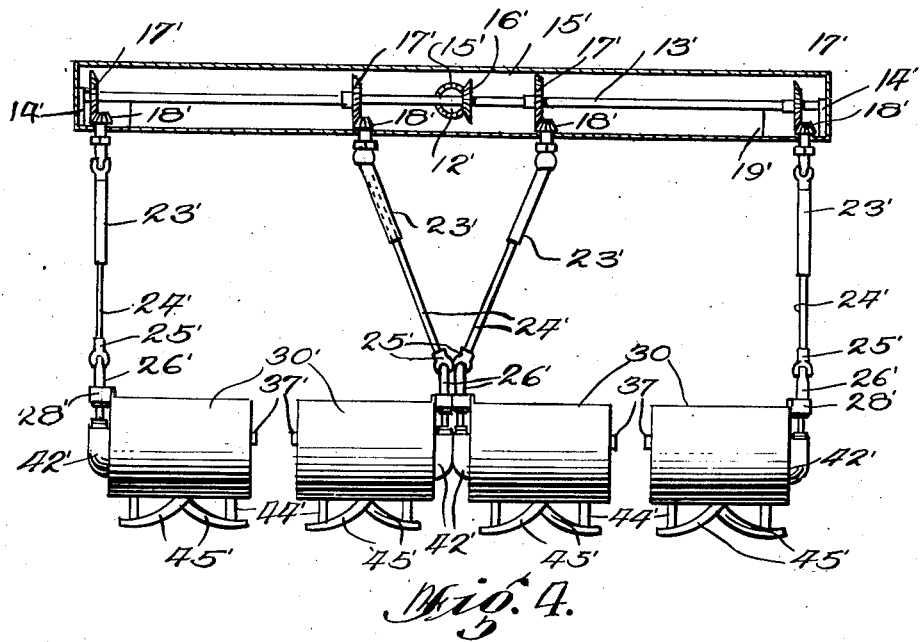
Figure 5:
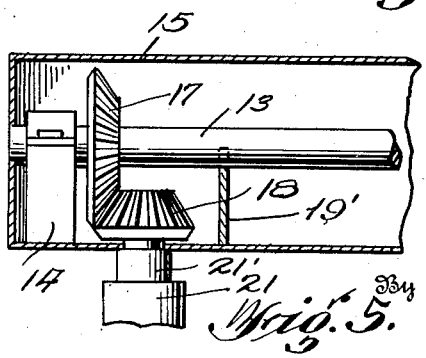

Fig. 1 of the drawings is a side elevation of a tractor equipped with my improved rotary hoe, Fig. 2, a section on line 2—2 of Fig. 1, Fig. 3, a detail of driving connections, Fig. 4, a vertical section of a modified form of my invention, showing a rear elevation of the hoes in such form, Fig. 5, an enlarged detail of a driving shaft and parts adjacent thereto, Fig. 6, a side elevation of driving means for a rotary hoe, partly in section, Fig. 7, an enlarged rear elevation of a hoe unit, partly in section, Fig. 8, a part section of the clutch in Fig. 6, Fig. 9, a side view of a modification, and Fig. 10, a detail of a drawbar and adjacent parts.

In the drawings, reference character 10 indicates generally a tractor having a motor 11 with a power take-off 12 of any suitable character whereby two shafts are driven, said shafts being mounted on the tractor frame in suitable bearings 14 located respectively in or under a pair of housings 15. The power take-off includes suitable means, such as conventional clutches (not shown) adapted to be operated by clutch levers to connect them to gears 15' on shafts 13 or to disconnect them therefrom.

A bevel gear 16 on each shaft 13 meshes with the adjacent gear 15' (Fig. 2) and four bevel gears 17 are fixed to shaft 13, one for each hoe unit, though the number may be varied as required. Each bevel gear 17 meshes with another bevel gear 18 mounted on a shaft 19 (Fig. 4) extending downward below the housing 15. Grease retainers 19' may be provided adjacent each set of bevel gears. To shaft 19 there is attached one member 20 of a universal joint, said member having a grease retaining cup 21 at its upper end surrounding the lower end of a bearing 21' for shaft 19, and said shaft is coupled at its lower end in any conventional or desirable manner to the lower member 22 of said universal joint, which in turn is secured to a shaft section 23, that has a central squared recess engaged by the squared shaft 24 to provide a telescoping or slip connection permitting the shaft 24 to slide up and down with reference to shaft 23. The lower end of shaft 24 carries the upper member 25 of a universal joint having a lower member 26 fixed on a shaft 27 journaled in a bearing 28 secured to a bracket 29 for vertical adjustment on a housing 30 by means of bolts 31 extending through elongated slots of bearing 28.

Shaft 27 has a ratchet or slip clutch member 32 splined thereto, the clutch member being forced downward by a spring 33 to hold said clutch member in engagement with a clutch member 34, which is integral with or secured to a sleeve 35 encircling the lower part of shaft 27, said sleeve being journaled in a bearing 36 fixed to one of a pair of drawrods 37 secured to housing 30, said sleeve carrying a pinion 38. The clutch member 34 is here shown as having one ore more rounded lugs 39 engaging notches in clutch member 32 to insure a continuous drive except when the hoes encounter strong resistance, in which case they can stop or even turn backward, the clutch member 32 then slipping over member 34.

Pinion 38 meshes with a gear 40 on the hoe-carrying shaft 41, said gear and pinion being protected by a suitable gear casing 42 (Fig. 7). The shaft 41 is journaled in suitable bearings, one of which is shown at 43 in Fig. 7, and said shaft carries radial arms 44 with segmental blades 45, each of said blades being mounted on said arms in such a manner as to extend diagonally of the axis of shaft 41, i. e., spirally about the rotary element. The blade first engages the ground at one end, and such engagement then proceeds progressively along the length of the blade until the entire blade has made its cut. By thus giving the blades a sort of draw cut the resistance of the soil to their action is equalized and a tilth is produced.

In a preferred embodiment of my invention I provide four units on a frame as shown in Fig. 2, the units at each end being spaced from the middle units and the latter being close together, so as to provide for cultivation of two rows at a time. By arranging the hoe units at the opposite sides of the machine with the hoes at one side suitably far ahead of the other hoes at the opposite side it is possible to locate the inner pair of hoes so that they will plow up the surface of the soil all the way between rows of plants without leaving an uncultivated strip at the middle of such space. Thus in Fig. 2 the housings 30, 30 of the middle pair of units are shown as overlapping to a substantial extent, so that the blades of the rearmost unit of the two will loosen further some of the soil already cut up by the forward unit. Alternatively the same units may be obviously positioned so as to merely cover all of the space in question without overlapping, as may be preferred. Obviously also this feature of the invention applies only to the spaces between alternate pairs of rows, since the spaces that are being partially cultivated by the hoes of the outer units 30, 30, must have their cultivation completed by subsequent or previous operation of similarly located outer units.

In the modified form of the invention shown in Fig. 4, the parts 13′ to 45′ are generally similar to those above described, except as hereinafter pointed out. Instead of two shafts 13, only one shaft 13′ is necessary, since the axes of all the hoes can be alined across the machine, and the shaft is driven by a single pinion 15″. Because of the location of this pinion and its driven gear 16′ at the mid-length of the shaft 13′ the shafting for driving the inner hoe units cannot extend straight down as in the previously described form of the invention, but these two lines must be spaced apart at the upper ends of the same and brought close together at their lower ends at the inner ends of the hoe shafts. The universal joints at the upper and lower ends of these lines of shafting permit such an arrangement to be made without difficulty, and the slidably connected longitudinally extensible shaft portions 23, 24, remain practically as free as before to move relatively lengthwise of each other, e. g., to permit the hoes to rise and fall individually and independently according to the contour of the ground, or when lifted out of active position, as by lever 48, for turning at the end of a row, etc. The telescoping connections may be placed either in the vertical portions of the lines of shafting or in an inclined portion of the same.

The shafting extending down to each hoe unit may be identical except for the inclined portions of the middle units, or they may differ in various ways if desired. I have shown a rockarm at 46 on a bracket extending down below the tractor body said bracket carrying a drawbar 47 journaled for rotation or oscillation, but squared so that the rods 37 will raise their hoes when the drawbar is oscillated. A lever 48 connected by a rod 50 to rockarm 46 (Fig. 10) provides means for raising the rotary hoes above the ground, as for road travel.

The rotary hoes may also be connected to the rear of the tractor, as in Fig. 9. In this figure the parts 15′, 24′, 28′ and 30′ may be as in Figs. 1 to 8 at 15, 24, 28 and 30, but are located at the rear of the tractor and are connected thereto by means of drawrods 51 pivoted to brackets 52 on the housings 30′ and suitably attached to the parts therein to pull the hoe assembly. For elevating the hoe assembly I have shown a link 54 pivoted to a lever 56. The lever may be arranged for manual operation to raise the assembly, or it may be operated by hydraulic means, as may also the assembly of Figs. 1 to 8. As one means for raising the assembly properly I have shown a link 55 attached to the housing at the side remote from the bracket 52, said link being secured at its other end to an intermediate part of link 54.

It will be obvious to those skilled in the art that many changes may be made in the devices of my invention, all without departing from the spirit of the invention, and therefore I do not limit myself to what is shown in the drawings and described in the specification, but only as indicated in the appended claims.

I claim:

1. In a machine of the power-operated rotary hoe type, a drive shaft adapted to extend transversely of a tractor or the like, sets of rotary hoes at opposite sides of the machine, one set being offset lengthwise of the machine relatively to the other and said sets being so positioned as to leave no uncultivated strip between them, the respective hoes next outward therefrom being spaced away from the adjacent hoes of the inner pair so as to afford space at each side of said inner pair for a row of plants, a drawbar for attachment to a tractor or the like, means connecting each hoe to said drawbar, and driving means between said hoes and said drive shaft.

2. In a machine of the power-operated rotary hoe type, a tractor, sets of rotary hoes at opposite sides of the tractor, one set being positioned forwardly of the other on the tractor and an inner pair of said hoes being arranged so as to preclude the leaving of an uncultivated strip between the hoes of said pair, the respective hoes to right and left of said pair being spaced laterally from the adjacent hoes of the inner pair to afford space for a row of plants at each side of said inner pair of hoes, a drawbar attached to the vehicle in advance of the hoes, means connecting each hoe to the drawbar, spaced drive shafts on the tractor above the respective sets of hoes, and driving connections between each shaft and the set of hoes beneath it.

3. In a machine of the power-operated rotary hoe type, a driving shaft, a driven shaft below said driving shaft, a rotary hoe on said driven shaft, a hood covering the hoe, connections between said shafts comprising a sleeve geared to the hoe shaft, a spindle concentric with said sleeve and extending above the same, clutch disks on said sleeve and spindle, a bearing for said spindle on said hood, a coil spring encircling said spindle, said coil spring acting to force said clutch disks together, means whereby the bearing on the hood may be adjusted axially along the spindle to vary the action of the spring on the clutch disks, and interengaging projections and depressions on said clutch disks adapted to ride over one another so as to compress the spring and disengage the clutch on overload.

4. In a machine of the power-operated rotary hoe type, a driving shaft, a driven shaft below the driving shaft, a rotary hoe on said driven shaft, connections between said shafts comprising a sleeve geared to the hoe shaft, a spindle concentric with said sleeve and extending above the same, an adjustable bearing for said spindle, interengaging clutch projections on said sleeve and spindle, spring means acting on said sleeve and spindle to force said clutch projections toward each other, and means whereby the spindle bearing may be adjusted axially of the spindle to vary the action of the spring on the clutch members, said clutch projections being adapted to compress the spring and interrupt the drive on overload, substantially as set forth.

5. In a machine of the power-operated rotary hoe type, a drive shaft, means for mounting the shaft crosswise of a vehicle having front and rear sets of wheels, gearing connecting said shaft to a power take-off on the vehicle, a plurality of rotary hoe units arranged directly below said shaft and between the sets of wheels, a pair of said units being spaced closely transversely of the machine, there being at each side of said pair of units another unit spaced from the adjacent one of said pair to allow space for a row of plants, a driven shaft in each unit forming the axis of rotation of said unit, and lines of shafting in a vertical plane passing through said driving and driven shafts and respectively connecting the outer ends of the shafts of the outer units and the inner ends of the shafts of the inner units to said drive shaft, substantially as set forth.

HARRY T. SMITH.